(12) United States Patent
Miwa et al.

(10) Patent No.: US 8,437,325 B2
(45) Date of Patent: May 7, 2013

(54) WIRELESS COMMUNICATION TERMINAL, AIR INTERFACE APPARATUS AND METHOD FOR PARTICIPATING IN WIRELESS NETWORK

(75) Inventors: Yasutaka Miwa, Tokyo (JP); Kenjiro Komaki, Saitama (JP); Tetsuo Watanabe, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/477,637

(22) Filed: May 22, 2012

(65) Prior Publication Data

US 2012/0230314 A1 Sep. 13, 2012

Related U.S. Application Data

(63) Continuation of application No. 11/123,868, filed on May 6, 2005, now Pat. No. 8,249,034.

(30) Foreign Application Priority Data

May 7, 2004 (JP) ................................. 2004-139178

(51) Int. Cl.
*H04W 4/00* (2009.01)
(52) U.S. Cl.
USPC ...... 370/338; 455/3.06; 455/41.2; 455/432.1; 455/432.3; 455/435.2; 455/557; 455/558; 713/168; 726/3
(58) Field of Classification Search .... 455/432.1–432.3, 455/435.2, 557, 558, 3.06, 41.2; 713/168; 370/338; 726/3
See application file for complete search history.

(56) References Cited

U.S. PATENT DOCUMENTS

| 6,711,409 B1 | 3/2004 | Zavgren, Jr. et al. | |
| 6,842,460 B1 | 1/2005 | Olkkonen et al. | |
| 7,171,216 B1 | 1/2007 | Choksi | |
| 2002/0116615 A1 | 8/2002 | Nguyen et al. | |
| 2003/0134591 A1* | 7/2003 | Roberts et al. | 455/3.06 |
| 2003/0149887 A1 | 8/2003 | Yadav | |
| 2003/0204748 A1 | 10/2003 | Chiu | |
| 2004/0063498 A1 | 4/2004 | Oakes et al. | |
| 2005/0083899 A1 | 4/2005 | Babbar et al. | |
| 2005/0147073 A1 | 7/2005 | Hietalahti et al. | |
| 2005/0148332 A1 | 7/2005 | Buckley et al. | |
| 2005/0148333 A1 | 7/2005 | Buckley | |
| 2005/0197101 A1* | 9/2005 | Gupta | 455/410 |

FOREIGN PATENT DOCUMENTS

JP 2003-289306 10/2003

OTHER PUBLICATIONS

Notification of Reason(s) for Refusal dated Feb. 16, 2010, from corresponding Japanese Application No. 2007-246012.
Decision of Refusal dated Jun. 29, 2010, from corresponding Japanese Application No. 2007-246012.

(Continued)

*Primary Examiner* — Amancio Gonzalez
(74) *Attorney, Agent, or Firm* — Katten Muchin Rosenman LLP

(57) ABSTRACT

A game device is provided with a processor and an air interface apparatus. In a wireless communication environment such as that of IEEE802.11, a CPU of the air interface apparatus selects, in a search process, an SSID that includes at least in a portion thereof a predetermined pattern. Network information including the selected SSID is retained in a memory unit as a BSS list registering wireless networks that are targets for connection. The processor refers to the BSS list and determines a wireless network to participate in.

10 Claims, 6 Drawing Sheets

OTHER PUBLICATIONS

"3GPP TS 24.234 V1.0.0 3rd Generation Partnership Project; Technical Specification Group Core Network; 3GPP System to WLAN Interworking; UE to Network Protocols; Stage 3 (Release 6)", Dec. 2003.

"SSID-Service Set Identifier" Bradley Mitchell, http://www.compnetworking.about.com.

"SIM (Subscriber Identity Module)", http://gemplus.com/techno.sim.

United States Office Action dated Apr. 5, 2007, from corresponding U.S. Appl. No. 11/123,868.

United States Office Action dated Sep. 24, 2007, from corresponding U.S. Appl. No. 11/123,868.

United States Office Action dated Dec. 28, 2007, from corresponding U.S. Appl. No. 11/123,868.

United States Office Action dated Jul. 1, 2008, from corresponding U.S. Appl. No. 11/123,868.

United States Office Action dated Dec. 30, 2008, from corresponding U.S. Appl. No. 11/123,868.

United States Office Action dated Dec. 9, 2009, from corresponding U.S. Appl. No. 11/123,868.

United States Office Action dated May 26, 2010, from corresponding U.S. Appl. No. 11/123,868.

United States Office Action dated Mar. 2, 2011, from corresponding U.S. Appl. No. 11/123,868.

United States Office Action dated Sep. 1, 2011, from corresponding U.S. Appl. No. 11/123,868.

* cited by examiner

| BSSID | SSID | ... |
|---|---|---|
| 02:90:EA:CD:5D:65 | TITLE_A_CLASS_1 | ... |
| 00:40:26:61:70:F8 | TITLE_A_CLASS_2 | ... |

WIRELESS COMMUNICATION TERMINAL, AIR INTERFACE APPARATUS AND METHOD FOR PARTICIPATING IN WIRELESS NETWORK

CROSS-REFERENCE TO RELATED APPLICATIONS

This application is a continuation of U.S. Ser. No. 11/123,868, which was filed on May 6, 2005, which is pending and claims Foreign Priority to Japan. Serial No. 2004-139178, which was filed on May 7, 2004 and which is hereby incorporated by reference in its entirety for all purposes.

BACKGROUND OF THE INVENTION

1. Field of the Invention

The present invention relates to a technology for performing communication between a plurality of communication terminals and, more particularly, to a technology for allowing a wireless communication terminal to participate in a wireless network efficiently.

2. Description of the Related Art

With the realization of miniaturization and lightweight of information terminals, it has become common for people to carry an information terminal. Wireless communication environment in which a plurality of users can enjoy an application such as game together using infrastructure such as base stations and access points has become a reality in recent years. Study has also been vigorously undertaken on the construction of wireless ad hoc network for on-demand communication. In an ad hoc network, base stations and access points are not necessary. It is therefore easy to build a wireless network even in places where no such infrastructure exists. In an ad hoc network, a plurality of users can enjoy a game together as they join each other, bringing their own portable game devices and communicating wirelessly.

An infrastructure network and an ad hoc network are built using technologies such as IEEE802.11 or Bluetooth. A wireless communication environment assumed conventionally is such that several terminals are brought together so that communication is achieved between the terminals. In an infrastructure network or an ad hoc network, however, a situation could occur in which as many as 10-100 terminals are brought together in the same environment.

In a wireless network using IEEE802.11, a Basic Service Set (BSS) is prescribed as a basic unit of group comprising terminals communicating with each other. BSS refers to a set which is a group of mutually communicating terminals. Terminals belonging to the same BSS can communicate with each other. A BSS is identified by an 48-bit identifier known as Basic Service Set ID (BSSID). A unique value in the environment is assigned to a BSSID. There is also available a Service Set ID (SSID) comprised of a character string of 0-32 bytes to discriminate between BSSs. SSID is arbitrary set. The same SSID may be assigned to a plurality of BSSs. A BSS is formed by a terminal or an access point transmitting a reference packet called beacon. The range reached by the beacon defines a spatial range of the BSS. A plurality of BSSs may be located in the same physical space.

When using a wireless network using IEEE802.11, a terminal is required to belong to one of the BSSs available. For this purpose, the terminal searches for (scans) BSSs located in its neighborhood. When participating in an existing group, the terminal may specify an SSID in case it has the knowledge of the SSID of a group in which participation is sought. In contrast, if the SSID is not known, the terminal scans all BSSs in its neighborhood and specifies an SSID selected from the SSIDs identified as a result of the search. It will be noted that the search for all BSSs is equivalent to a search designating ANY as the SSID.

Thus, when a large number of BSSs exist in the neighborhood and when a terminal does not have the knowledge of the SSID of the BSS in which participation is sought, the terminal should designate ANY so as to list all BSSs in the neighborhood to allow the a user to select and designate a desired BSS in the list. Data related to a BSS has attached thereto a variety of information. By listing the information on all BSSs in the neighborhood, the list grows large disadvantageously when there are a large number of BSSs. To address this, a sufficient storage area for retaining the list should be reserved. It is unfavorable, however, to enlarge the capacity of a memory merely for the purpose of retaining the list. Another problem is that it takes a long period of time for the terminal to identify the BSS in which it seeks participation because all BSSs existing in the neighborhood are listed. In this background, it is required to efficiently prepare a list of BSSs that are candidates for connection.

SUMMARY OF THE INVENTION

An object of the present invention is to provide a technology for allowing a wireless communication terminal to participate a wireless network efficiently.

In order to solve the aforementioned problems, the present invention according to one aspect provides a method that allows a wireless communication terminal to participate in a wireless network. In the method according to this aspect, a wireless communication terminal acquires and lists network identifiers each including a predetermined pattern, from among network identifiers which identify wireless networks and which are received as a result of a search for wireless networks in a neighborhood, selects a wireless network corresponding to one of the listed network identifiers, and participates in the selected wireless network.

The present invention according to another aspect provides a wireless communication terminal provided with a processor and an air interface apparatus. The wireless communication terminal according to this aspect comprises a processor and an air interface apparatus, wherein the air interface apparatus comprises: a selection unit which selects a first network identifier acquired as a result of a search and including at least in a portion thereof a predetermined pattern; and a first memory unit which stores network information related to a wireless network specified by the first network identifier selected by the selection unit, and wherein the processor comprises: a second memory unit which stores the network information read from the first memory unit; and a determination unit which determines a wireless network to participate in, from among wireless networks corresponding to the network information stored in the second memory unit.

The present invention according to still another aspect provides a wireless communication terminal. The wireless communication terminal according to this aspect comprises: a selection unit which selects a first network identifier acquired as a result of a search and including at least in a portion thereof a predetermined pattern; a memory unit which stores network information related to a wireless network specified by the first network identifier selected by the selection unit; and a determination unit which determines a wireless network to participate in, from among wireless networks corresponding to the network information stored in the memory unit.

The present invention according to yet another aspect provides an air interface apparatus. The air interface apparatus according to this aspect comprises: a selection unit which selects a network identifier acquired as a result of a search and including at least in a portion thereof a predetermined pattern; and a memory unit which stores network information related to a wireless network specified by the network identifier selected by the selection unit.

The present invention according to yet another aspect provides a wireless communication terminal. The wireless communication terminal according to this aspect comprises: a memory unit which stores a network identifier for identifying a wireless network to which the terminal belongs; and an identifier modifying unit which generates a new network identifier by appending a character string to the network identifier stored in the memory unit.

The present invention according to yet another aspect provides a wireless communication terminal. The wireless communication terminal according to this aspect comprises: a memory unit which stores a network identifier for identifying a wireless network to which the terminal belongs; and an identifier modifying unit which generates a new network identifier in which common portion included in the network identifier stored in the memory unit is excluded.

Arbitrary combinations of the aforementioned constituting elements and implementations of the invention in the form of methods, apparatuses, systems, recording mediums and computer programs may also be practiced as additional modes of the present invention.

DETAILED DESCRIPTION OF THE INVENTION

Figure 1:
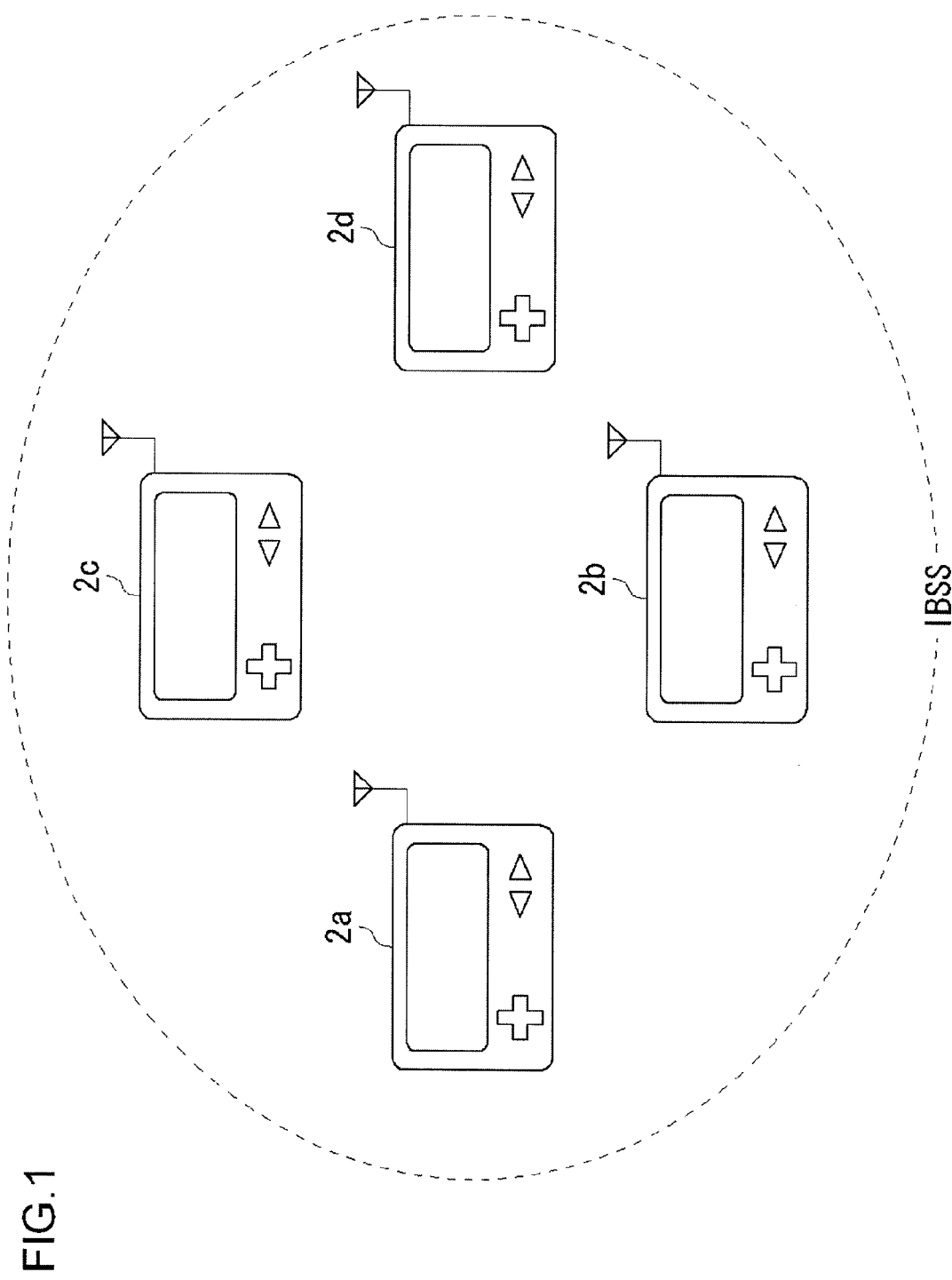
FIG. 1 illustrates an IBSS in an ad hoc network using IEEE802.11.

FIG. 1 is a schematic illustration of an Independent Basic Service Set (IBSS) in an ad hoc network using IEEE802.11. IBSS corresponds to a wireless network. Stations in the IBSS can directly communicate with each other. In FIG. 1, four game devices 2a, 2b, 2c and 2d are illustrated as examples of the wireless communication terminals (stations). The number of game devices 2 constituting the IBSS is not limited to four. Any number of devices other than four may constitute the set. Each of the game devices 2 is provided with a wireless communication function. By bringing a plurality of game devices 2 together, a wireless network is built. A wireless ad hoc network is built by using a wireless LAN standard such as IEEE802.11.

In the IBSS, communication between a plurality of game devices 2 is achieved by building an ad hoc network without requiring infrastructure such as base stations and access points. The present invention is not only applicable to an ad hoc network but also to an infrastructure network. Hereinafter, an ad hoc network is described as an example of environment to which the present invention is applied.

Figure 2:
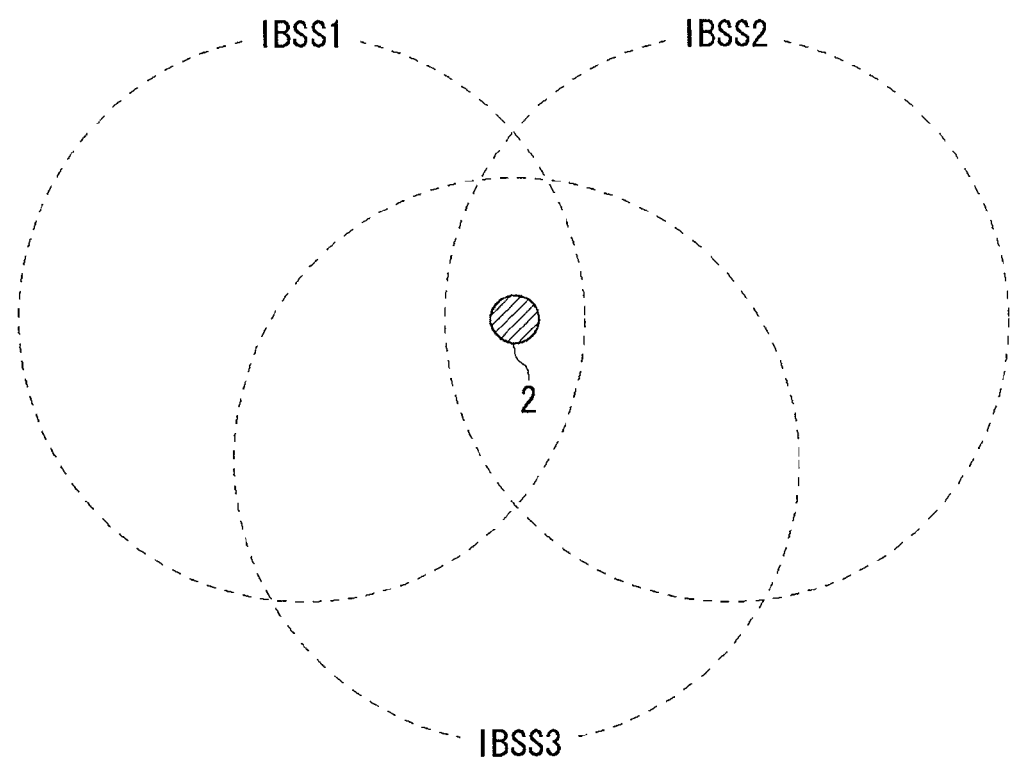
FIG. 2 illustrates a state in which a plurality of IBSSs are formed in a single environment.

FIG. 2 is a state in which a plurality of IBSSs are formed in a given environment. In the example of FIG. 2, three IBSSs are formed. The game device 2 is located in the communication range of IBSS1, IBSSS2 and IBSS3. The communication range of IBSS is called a basic service area. The basic service area is determined by propagation characteristic of a wireless medium. For example, when members of each IBSS are running a game application, the game device 2 is capable of participating in the game by subscribing to the IBSS in which the game application desired to be played is being run.

Figure 3:
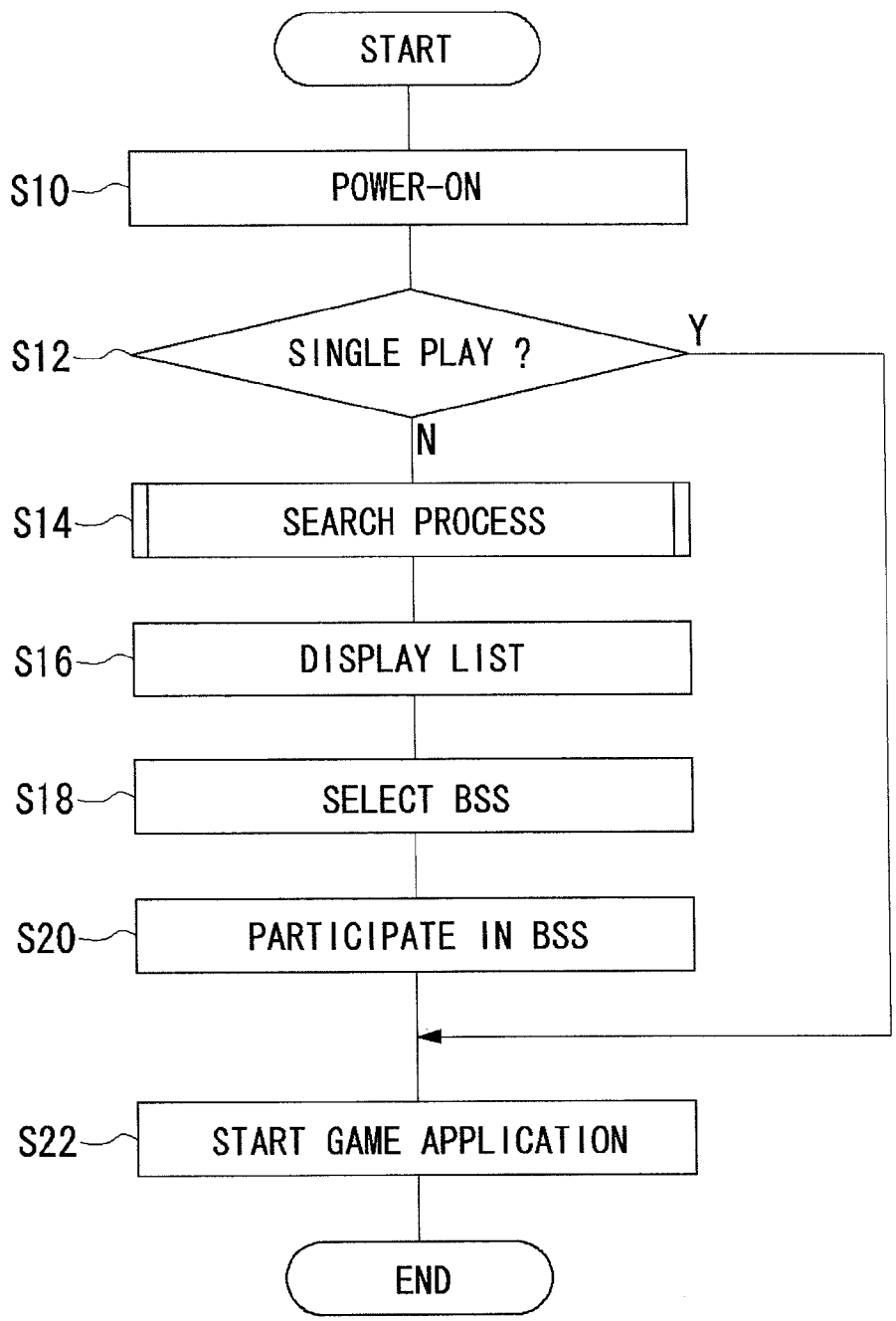
FIG. 3 is a flow chart for steps performed until a player starts a game application.

FIG. 3 is a flowchart for steps performed until a player starts a game application. Initially, the player turns the power of the game device 2 on (S10). It will be assumed that a recording medium storing a game program played is inserted in a media drive of the game device 2. The recording medium may store a program for communication. The program for communication may be stored in a ROM of the game device 2.

When the power is turned on, the game program is read from the recording medium so that the game application is started. The display screen of the monitor of the game device 2 prompts the user to select "single-player mode" or "play with other users". "Play with other users" represents a match-up mode of play in, for example, a beat'-em-up game. By selecting the match-up mode, the user can enjoy playing a game with other users over a wireless network. When a single play is selected (Y of S12), the game application is started (S22) so that the player can enjoy a game in a single-player mode.

When a match-up mode is selected (N of S12), the game device 2 searches for a BSS to participate in (S14). Two methods for searching a BSS are available. In one method, the game device 2 transmits a search packet and receives a return packet responsive to the search. In the other, the game device 2 receives a beacon signal for a period of time. The return packet and the beacon include network information such as BSSID and SSID related to the BSS, i.e., the wireless network.

When there are on the order of 10-1000 other game devices in the neighborhood, searching for all BSSs by designating ANY may result in a huge list that cannot be stored in a memory of the game device 2. Since the number of BSSs existing in the neighborhood is unknown, it may be possible to enlarge the memory capacity in anticipation of any conceivable situations. Meanwhile, it is naturally more cost-effective to configure the memory capacity to be small. For this reason, it is favorable, in respect of cost and processing time, that the BSS list generated be sufficiently small to be handled by a small memory capacity.

In the game system according to the example, the game device 2 searches for another game device as an opponent in a match-up, or searches for a lobby IBSS in which match-up with another game device is possible. The SSID of a lobby IBSS (hereinafter, referred to as "lobby SSID") is set up in a manner dependent on each of individual game titles. A plurality of lobby IBSSs may be set up for a game application. A variety of lobby IBSSs having a variety of roles in relation to the game application may be formed. For example, a lobby IBSS may serve as a general-purpose lobby room in the game application. Another lobby IBSS may serve as a lobby room associated with a skill in the game application. By setting up lobby IBSSs in a manner dependent on each of individual game titles, only the game devices that play the same game are brought together in a lobby IBSS. By bringing together players playing the same game, players can engage themselves in a match-up on the spot or search for an opponent in a match-up easily. As such, the advantage of a lobby IBSS will be enhanced.

In the example of the present invention, the SSID of a lobby IBSS related to a game application is generated such that it contains a pattern uniquely established for the game application. The pattern set up for each of individual game applications will be referred to as a game identification pattern. In the example, given that a game identification pattern of "TITLE_A" is set up for a game application A, the lobby SSID in the game application is configured to include "TITLE_A" plus a character string. The game identification pattern itself may serve as a lobby SSID.

The game identification pattern may directly be written in a game program. In this case, the game device 2 reads the game identification pattern from the game program and searches for an SSID having the game identification pattern. With this, it is possible to find the lobby IBSS of the game application identified by the game identification pattern. By acquiring the BSSID of the lobby IBSS, the game device 2 can participate in the lobby IBSS. The game identification pattern may not be written in a game program in order to prevent extra load from being imposed on a producer of the game program. In this case, a lobby ID uniquely assigned to each of individual game titles is written in a game program. The communication program provided in the game device 2 generates a game identification pattern on the basis of the lobby ID. The lobby ID may preferably be defined as a simple character string. Hereinafter, for the sake of brevity, the game identification pattern "TITLE_A" is set up for the game title A, and the game identification pattern "TITLE_B" is set up for the game title B.

A lobby ID may have the role of a game ID specifying a game title. By not requiring attention from the producer of a game program to the game identification pattern and by allowing the communication program to automatically generate a game identification pattern, extra load is prevented from being imposed on the producer of the game program. When a group of users wish to bring themselves together in a exclusive lobby IBSS, the users may set up a group name. The communication program may generate a new lobby IBSS independent of the lobby IBSS of the same title, on the basis of the lobby ID and the group name.

In the example, the game device 2 searches for BSSs in the neighborhood and lists network information having an SSID that includes a predetermined pattern. In searching for BSSs related to the game application A, the game device 2 lists the network information having an SSID that includes "TITLE_A". By filtering the SSIDs, the number of SSIDs listed is limited. According to this approach, the scale of the list is reduced in comparison with a case where all BSSs in the neighborhood are listed. It is thus possible for a memory of a small capacity to retain the list. The generated list is displayed on a monitor of the game device 2 (S16). For example, the monitor may display a list listing a lobby room for beginners, a lobby room for intermediate players and a lobby room for advanced players.

A user sees the list displayed by the game device 2 and selects a BSS in which the user seeks participation (S18). This causes the game device 2 to participate in the selected lobby IBSS (S20). Subsequently, the game application is started in the game device 2 (S22). By transmitting and receiving information in wireless communication with other game devices in the group, the user can play a match-up game.

Figure 4:
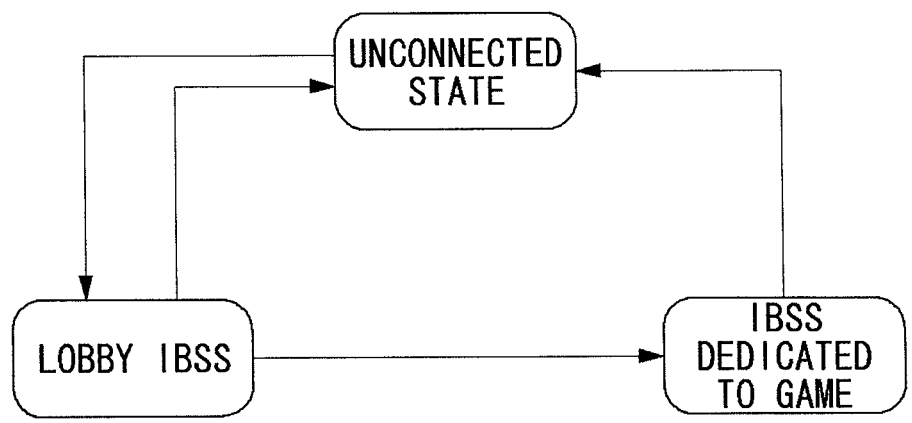
FIG. 4 illustrates how a game device communicates.

FIG. 4 is a diagram illustrating transition between states of the game device. In the ad hoc network of the example, three communication states are established, i.e., an unconnected state in which the game device is not participating in any IBSSs, a state in which the game device is participating in a lobby IBSS and a state in which the game device is participating in an IBSS dedicated to a game. The unconnected state corresponds to a state occurring immediately after power-on of the game device 2 or a state in which the user plays in a single-player mode. In the unconnected state, the game device 2 acquires and lists network information that includes a predetermined pattern. By allowing the user to select one wireless network from the list, the game device 2 enters the lobby IBSS.

In the lobby IBSS, the game devices 2 can chat with each other or engage themselves in a match-up game. In the example, the game identification pattern "TITLE_A" is set up for the game title A. For example, a lobby SSID for beginners, a lobby SSID for intermediate players and a lobby SSID for advanced players are set up by attaching mutually different character strings to "TITLE_A". With this, in a search for a lobby IBSS for the game title A in the unconnected state, IBSSs for other game titles and IBSSs other than those for game applications are removed from the search by specifying, in the search, IBSSs with SSIDs that include "TITLE_A".

As described as an example, lobby IBSSs may be formed in accordance with the gaming skill. In this case, a lobby IBSS for beginners, a lobby IBSS for intermediate players and a lobby IBSS for advanced players, etc. may be formed. The user can determine which lobby IBSS to participate in depending on the user's own skill and enjoy the game with users of the same skill. In this case, the SSID of the lobby IBSS for beginners may be set up as "TITLE_A_CLASS_1", the lobby IBSS for intermediate players may be set up as "TITLE_A_CLASS_2" and the SSID of the lobby IBSS for advanced players may be set up as "TITLE_A_CLASS_3". It favorable that the SSIDs of the lobby IBSSs of the same title be associated with each other by including at least the game identification pattern "TITLE_A" in the SSIDs of the lobby IBSSs. With the benefit of this association, the search for lobby IBSSs of the same title can be performed easily. As illustrated in this example, the SSIDs of the lobby IBSSs may be formed by attaching mutually different character string patterns at the end of the game identification patterns.

Thus, by including a common pattern in the SSIDs of a plurality of lobby IBSSs of the same game title, the IBSSs are associated with each other. In this example, "TITLE_A" (or "TITLE_A_") is the common pattern. By establishing the common pattern, it is possible to search for lobby IBSSs efficiently.

Lobby IBSSs may also be formed in accordance with the status of game such as stages of a game. In this case, a lobby IBSS for stage 1, a lobby IBSS for stage 2, a lobby IBSS for stage 3 and the like may be formed. It is likewise ensured that the SSIDs of the plurality of IBSSs contain the common pattern. The SSID of the lobby IBSS for stage 1 may be set up as "TITLE_A_STAGE_1", the SSID of the lobby IBSS for stage 2 may be set up as "TITLE_A_STAGE_2" and the SSID of the lobby IBSS for stage 3 may be set up as "TITLE_A_STAGE_3". In this example, too, "TITLE_A" corresponds to the common pattern.

The game device 2 participating in the lobby IBSS can enter an IBSS dedicated to a game exclusively available to a group participating in a match-up. Players may engage themselves in a match-up in the lobby IBSS. The game system according to the example enables a group to build a new IBSS dedicated to the game once the group participating in the match-up is finalized and if the group does not wish to accept participation of a third party in the game. In order to enter the IBSS dedicated to the game, an IBSS parameter dedicated to the game (game-specific IBSS parameter) used in the group is shared. For example, one of the members constituting the group may generate a game-specific IBSS parameter so that the parameter is shared by notifying the other members of the parameter. The parameter may be an SSID or a frequency band used. The game device 2 enters the IBSS dedicated to the game by setting the game-specific IBSS parameter in a library. The IBSS dedicated to the game is a group constituted by a plurality of game devices playing the game at the same time and corresponds to one of individual wireless networks set up for respective groups. A plurality of IBSSs each dedicated to a game may be provided in the same environment.

The game device 2 can return from the lobby IBSS or the IBSS dedicated to the game back to the unconnected state at an arbitrary point of time. When returning from the IBSS dedicated to the game to the lobby IBSS, the game device 2 temporarily makes a transition to the unconnected state before participating in the lobby IBSS.

When executing power saving control or control for avoidance of signal collision in the game system according to the example, different modes of control may be applied to the lobby IBSS and to the IBSS dedicated to the game. The lobby IBSS and the IBSS dedicated to the game may differ in requirement for latency, etc. Therefore, efficient communication is achieved by applying different modes of control to individual IBSSs established.

Figure 5:
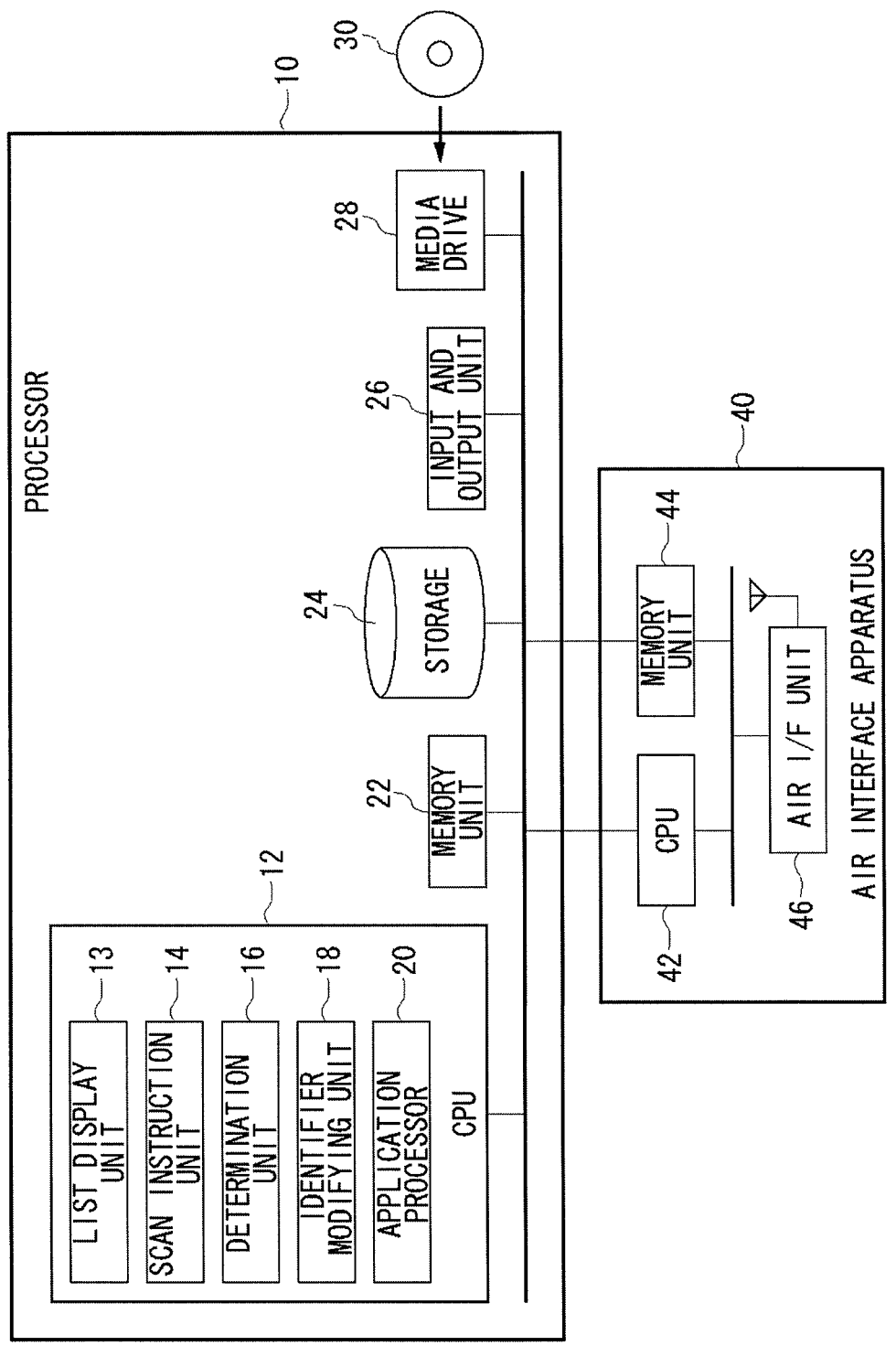
FIG. 5 is the functional block diagram of a game device.

FIG. 5 is a functional block diagram of the game device 2. The game device 2 is formed as a wireless communication terminal and is provided with a processor 10 primarily performing operations related to games and an air interface apparatus 40 performing operations related to communication. The processor 10 and the air interface apparatus 40 are provided as separate hardware. The processor 10 and the air interface apparatus 40 are electrically connected to each other by a bus. The processor 10 is formed as a host PC and is provided with the function of managing the operation of the air interface apparatus 40.

Functions for communication in the example are implemented in the processor 10 and the air interface apparatus 40 by a CPU, a memory, a program loaded into the memory and the like. FIG. 5 depicts functional blocks implemented by the cooperation of the elements. The program may be built in the game device 2 or supplied from an external source in the form of a recording medium. Therefore, it will be obvious to those skilled in the art that the functional blocks may be implemented by a variety of manners including hardware only, software only or a combination of both. In the illustrated example, a CPU 12 of the processor 10 has the function of a list display unit 13, a scan instruction unit 14, a determination unit 16, an identifier modifying unit 18 and an application processor 20. A CPU 42 of the air interface apparatus 40 has the function of searching for BSSs.

An input and output unit 26 accepts an input from a user and provides an output to the user. More specifically, the unit 26 as an input unit comprises a group of buttons including an arrow key that accept commands from a user for operation. The unit 26 as an output unit is provided with a monitor and speaker. A storage 24 is formed as an external storage device such as a memory stick and is used to save game data, for example. A disc-shaped recording medium 30 is inserted into a media drive 28 so that programs and data stored in the recording medium 30 are read. The programs and data thus read are stored in a memory unit 22 and used in processes in the CPU 12. The memory 22 is of a capacity larger than that of a memory unit 44 of the air interface apparatus 40. FIG. 5 depicts memory units being provided both in the processor 10 and the air interface apparatus 40. Alternatively, the memory units may be aggregated. In a structure in which the memory units are aggregated, the processor 10 and the air interface apparatus 40 may be integrally formed.

When the power of the game device 2 is turned and the user selects a match-up mode, the scan instruction unit 14 acquires a lobby ID described in the game program and generates a game identification pattern from the lobby ID. The game identification pattern is uniquely determined from the lobby ID. As already described, by ensuring that the game identification pattern is uniquely established for the game title, the same game identification pattern is determined in the game devices, given the same game title. The game identification pattern of the game title A is determined as "TITLE_A" on the basis of the lobby ID of the game title A. Likewise, the game identification pattern of the game title B is determined as "TITLE_B" on the basis of the lobby ID of the game title B. The recording medium 30 stored a game program of the game title A and so the scan instruction unit 14 generates the game identification pattern "TITLE_A". The scan instruction unit 14 may establish a pattern set up by the user via the input unit as the game identification pattern.

The scan instruction unit 14 directs the CPU 42 to search for lobby IBSSs in the neighborhood. These operations of the scan instruction unit 14 are performed in response to the user's selection of a match-up game mode. As the search is being performed, there may be IBSSs for other game titles or IBSSs for applications other than a game in addition to IBSSs of the game title A. In an environment in which a large number of wireless networks are built, a related-art attempt to prepare a list from the entire network information received by an air interface unit 46 from a search designating an SSID "ANY" may result in an excessively large list, preventing the desired network information from being stored in the memory unit 44.

In the example, the scan instruction unit 14 directs the CPU 42 of the air interface apparatus 40 to search for SSIDs that include a predetermined pattern (game identification pattern). In this process, the scan instruction unit 14 designates SSIDs of target IBSSs as "TITLE_A*". "*" denotes a pattern that matches any character including a null character. The lobby SSID of the game title A includes "TITLE_A" at the head. Therefore, by designating SSIDs of target IBSSs as "TITLE_A*", it is easy to detect lobby IBSSs of the game title A by software means.

Referring to FIG. 2, a case will be considered where the game device 2 performs a search process. It will be assumed that the SSID of IBSS1 is "TITLE_A_CLASS_1", the SSID of IBSS2 is "TITLE_A_CLASS_2" and the SSID of IBSS3 is "TITLE_B_STAGE_2". When the air interface unit 46 receives network information that includes SSIDs from IBSS1, IBSS2 and IBSS3 as a result of a search, the CPU 42 performs a pattern matching process using "TITLE_A*" designated by the scan instruction unit 14. The pattern matching process is based on a determination as to whether each of SSIDs includes a predetermined pattern, i.e., whether an SSID includes "TITLE_A" at the head. It will be found that "TITLE_A_CLASS_1" and "TITLE_A_CLASS_2" include "TITLE_A" at the head. The CPU 42 then stores network information related to wireless networks identified by "TITLE_A_CLASS_1" and "TITLE_A_CLASS_2" in the memory unit 44 in the form of a list. As such, the CPU 42 functions as a selection unit for selecting SSIDs that include a predetermined pattern at least in its portion. In this process, the CPU 42 discards the network information related to "TITLE_B_STAGE_2". By filtering the SSIDs to obtain a list, it is ensured that the list formed is small in size and the capacity of the memory unit 44 is efficiently used.

In the above example, a lobby SSID is formed by attaching a character pattern at the end of the game identification pattern. That is, a search process is performed by so-called right truncation. In case a lobby SSID is formed by attaching a character pattern at the head of the game identification pattern, a search for a target lobby SSID may be made by left truncation. In case a lobby SSID is formed by attaching a character pattern at the head and end of the game identification pattern, a search for a target lobby SSID may be made by determining whether a game identification pattern is included in any location. Thus, the example is non-limiting in terms of the location of pattern matching referred to in the scanning process.

Figures 6, 7:
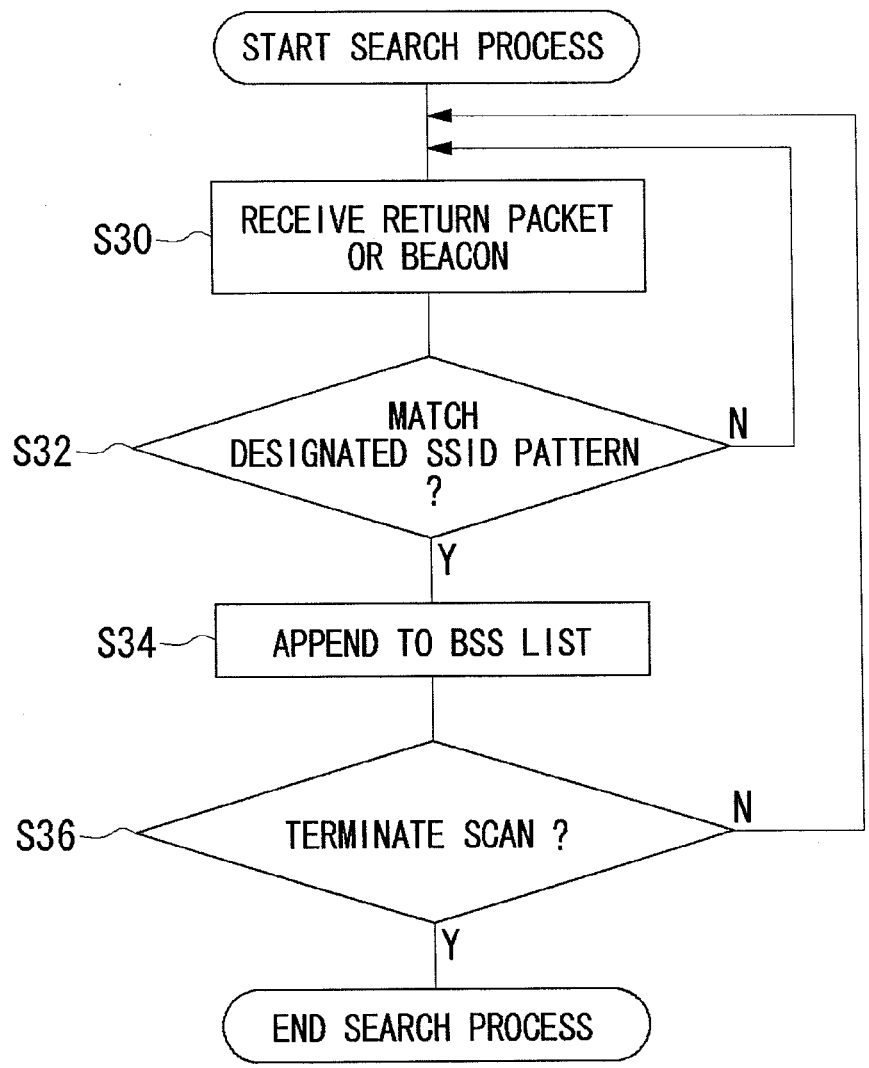
FIG. 6 is a BSS list stored in a memory unit.
FIG. 7 is a flow chart for a search process.

FIG. 6 is a BSS list stored in the memory unit 44. The BSS list stores network information such as BSSID, SSID and the like related to wireless networks. SSID has the function as a network identifier identifying a wireless network. As already described, the same SSID may be assigned to a plurality of wireless networks. In contrast, BSSID is a network identifier uniquely identifying a wireless network. Accordingly, in order to participate in a desired IBSS, it is favorable to specify a wireless network on the basis of BSSID. The BSS list is read into the memory unit 22 of the processor and stored therein.

The list display unit 13 causes the monitor of the processor 10 to display information derived from the network information stored in the memory unit 22 in the form of a list. For example, a BSS with the SSID including "CLASS_1" may be displayed as "match-up mode for beginners" and a BSS with the SSID including "CLASS_2" may be displayed as "match-up mode for intermediate players". The displayed contents may be determined depending on other information. For example, the group name agreed upon by a group of players may be displayed. The player specifies a group to participate in, using the input unit. The determination unit 16 refers to the group designated by the input to determine the BSSID of the wireless network for the game device 2 to participate in selected from the wireless networks included in the BSS list. The BSSID is reported to the CPU 42 of the air interface apparatus 40. Hereinafter, communication within the group is conducted using the BSSID. More specifically, the application processor 20 executes a game program. An input from the user for operation is transmitted to other game devices within the group using packets that include the BSSID, via the air interface apparatus 40. An input from other game devices within the group is received via the air interface apparatus 40 and processed by the application processor 20.

As described above, by listing only those IBSSs that are candidates for connection, memory consumption in the air interface apparatus 40 is reduced so that the scale of the memory unit 44 can be reduced. Further, power consumption in the processor 10 may be reduced while the IBSSs are not found, by, for example, setting the processor 10 to a power saving mode until the IBSSs are detected by pattern matching.

FIG. 7 illustrates a flow for a search process. In one method of search, the game device 2 may transmit a search packet and receive a return packet in response to the search. Alternatively, the game device 2 may receive a beacon transmitted from other game devices 2 for a predetermined period of time (S30). The return packet and the beacon include network information such as BSSID and SSID.

The CPU 42 of the air interface apparatus 40 determines whether the SSID included in network information matches the SSID pattern designated by the scan instruction unit 14 (S32). When they do not match, the CPU 42 makes a determination on a match between other network information and the SSID pattern.

When they match (Y of S32), the CPU 42 appends the network information including the matching SSID to the BSS list (S34). By appending, to the BSS list, only those SSIDs that include in a portion thereof a predetermined pattern, it is ensured that the network information for IBSSs that cannot be candidates for connection is not registered in the BSS list. Thus, it is ensured that the BSS list formed is small in size. When there are SSIDs that remain not scanned, (N of S36), the series of steps between and inclusive of S30 and S34 are repeated. When all SSIDs are scanned, the search process is terminated (Y of S36).

A description will now be given of a method of modifying an identifier. In the above example, a lobby SSID is formed by appending a character string at the end of the game identification pattern. When the IBSS that the user wishes to participate in is already formed, the game device 2 need not generate a new SSID. When the IBSS is not formed, one of the game devices 2 need generate an SSID. In such a case, a new IBSS is generated by allowing the identifier modifying unit 18 to append a character string to the game identification pattern. More specifically, when a lobby SSID for match-up between advanced players of the game title A has not been generated, a new SSID (TITLE_A_CLASS_3) may be generated by allowing the identifier modifying unit 18 to append a character string (_CLASS_3) to the game identification pattern (TITLE_A).

The identifier modifying unit 18 may generate another new SSID. For example, when the user in a lobby IBSS for match-up between beginners wishes to play with specific players, a new SSID (TITLE_A_CLASS_A_friends) may be generated by allowing the identifier modifying unit 18 to append a character string (for example, _friends) to TITLE_A_CLASS_1. In a game requiring a predetermined number of players such as a mah-jong game, no more participants are necessary once four people are brought together. Given this situation, a group comprising only four members may be formed by setting a new SSID so as to build a new IBSS. By not accepting participation of a third party in the middle of the game, the mah-jong game is enjoyed in a closed environment available only to the four people.

One method of not accepting mid-game participation is to generate a new SSID from which is excluded a common portion included in the lobby SSID (TITLE_A_CLASS_1), i.e., the game identification pattern "TITLE_A". Since TITLE_A is a key word to search for a lobby IBSS of the game application A, it is ensured that the group is not picked up by a search by other game devices, by allowing the identifier modifying unit 18 to generate a new SSID excluding the keyword. Contribution is also made to reduction of list size in other game devices.

Described above is an explanation based on the example. The embodiment is only illustrative in nature and it will be obvious to those skilled in the art that variations in constituting elements and processes are possible within the scope of the present invention. In the above example, a description has been given of generation of an IBSS in an ad hoc network. The present invention is not only applicable to an ad hoc network but also to an infrastructure network. The benefits including reduction in list size, efficient use of the memory unit 44 and efficient participation in a wireless network are available also in an infrastructure network, by detecting SSIDs that include a predetermined pattern at least in a portion thereof and listing the detected SSIDs.

In the example, the search process has been described as being performed in a transition from the unconnected state to the lobby IBSS. Alternatively, the search process may be performed in the lobby IBSS. For example, the search process may be performed while the user having made a transition to an IBSS for beginners is still in that IBSS, for entry into a lobby IBSS for intermediate players. With this, IBSSs in which the same application is run are listed not only in the unconnected state but also in the lobby IBSS. Thereby, transition between lobby IBSSs is achieved in a short period of time.

What is claimed is:

1. A wireless communication terminal comprising:
    a memory unit which stores a network identifier for identifying a wireless network to which the terminal belongs; and
    an identifier modifying unit which generates a new network identifier by appending a pattern to the network identifier stored in the memory unit or excluding a pattern included in the network identifier.

2. The wireless communication terminal according to claim 1, wherein
    the identifier modifying unit generates the new network identifier by appending a character string to the network identifier stored in the memory unit.

3. The wireless communication terminal according to claim 2, wherein
    the identifier modifying unit appends the character string at the end of the network identifier.

4. The wireless communication terminal according to claim 1, wherein the identifier modifying unit generates the new network identifier in which common portion included in the network identifier stored in the memory unit is excluded.

5. The wireless communication terminal according to claim 1, wherein the identifier modifying unit generates the new network identifier in which a keyword to search for a wireless network is excluded.

6. The wireless communication terminal according to claim 1, wherein, when the wireless network is set up for an application, the identifier modifying unit generates the new network identifier in which a pattern uniquely established for the application is excluded.

7. The wireless communication terminal according to claim 1, wherein the wireless network is set up for an application, and the wireless communication terminal sets up a group in the wireless network with other wireless communication terminals running the same application.

8. The wireless communication terminal according to claim 1,
    wherein the wireless communication terminal is a game device configured to run a game program,
    wherein a game identification pattern uniquely set up for the game or a character string for generating a game identification pattern is described in the game program, and
    wherein the network identifier for identifying the wireless network to which the terminal belongs includes the game identification pattern.

9. A method for generating a network identifier comprising:
    storing a network identifier for identifying a wireless network to which the terminal belongs; and
    generating a new network identifier by appending a pattern to the network identifier stored or excluding a pattern included in the network identifier.

10. A program stored on a non-transitory computer readable medium for causing a computer capable of executing a wireless communication function to carry out the steps of:
    storing a network identifier for identifying a wireless network to which the terminal belongs; and
    generating a new network identifier by appending a pattern to the network identifier stored or excluding a pattern included in the network identifier.

* * * * *